Inventor
CHARLES SKINNER HALLPIKE
AND LOUIS BLACKMORE

United States Patent Office 2,823,666
Patented Feb. 18, 1958

2,823,666

APPARATUS FOR ILLUMINATING AND INSPECTING CAVITIES

Charles Skinner Hallpike, London, and Louis Blackmore, Ashtead, England, assignors to National Research Development Corporation, London, England, a British body corporate Application April 13, 1953, Serial No. 348,229

Claims priority, application Great Britain April 15, 1952

16 Claims. (Cl. 128—9)

The present invention relates to an apparatus for illuminating and inspecting cavities in human beings and animals and is principally, but not exclusively, directed to apparatus for assisting in otological examinations and operations and to proctoscopes.

In such apparatus a speculum is employed for insertion into the cavity, e. g. an ear, to open out the fleshy parts of the cavity, e. g. the outer ear, and form a passage through which examination may be carried out or through which instruments may be inserted to perform any necessary operations.

One particular purpose of apparatus made in accordance with the present invention is to enable the human tympanic membrane and middle ear to be inspected under magnification and to be operated upon. For this purpose it is first required that a beam of light, powerful and of even intensity, should be projected along a suitable aural speculum. Such a speculum is conical in shape, the narrow end being inserted into the ear passage. The narrow end may vary in size from 2-3 mms. for a child up to 10 mms. for an adult, whilst the broad end at the base of the cone may be from 15-25 mms. in width, thus facilitating the introduction of operating instruments.

One of the problems arising in designing an instrument of the present kind is to ensure that the inside walls of the speculum are substantially unilluminated, so that the operator does not become quickly tired by the glare of the light reflected from the sides of the speculum. The light beam passing down the speculum must therefore be parallel to slightly convergent in order to achieve this object. In order to achieve the desired result a special optical system may be employed for producing the desired convergent beam, which at the same time does not interfere with the visual observation down the speculum by the operator.

In the broadest aspects of the present invention an apparatus for examining cavities comprises a casing adapted to carry a speculum and a viewing miscroscope substantially in line with each other, having a mirror so mounted in the casing that the axis of the part of the mirror lying on the axis of a speculum carried by the casing is oblique to the speculum axis, said mirror having a light-passing aperture lying in the line of sight between the speculum and the viewing microscope, said mirror forming part of an optical system adapted to direct a parallel or convergent ring-shaped beam of light along the speculum from an annular area around the light-passing aperture therein. It is to be understood that the word "microscope" is here intended to cover any apparatus capable of magnifying the object viewed.

According to a further feature of the present invention the apparatus, which may be a device for use as an otological miscroscope, comprises a casing having front and rear apertures in line with each other for mounting a speculum and a viewing microscope respectively, a concave mirror arranged on the line of sight between the two apertures and inclined with respect thereto, the portion of the mirror on the line of sight being light-passing i. e. removed, or unsilvered, to permit direct viewing through the miror, a light source arranged above the concave mirror adapted to give a ring-shaped beam of light, a condenser lens system arranged in front of the light source to form a real image of the source in the vicinity of the surface of the concave mirror, the light from the condenser being folded back on to the concave mirror by a plane mirror positioned on the front of the casing above the speculum aperture. An adjustable iris diaphragm is preferably arranged in front of the condenser lens system, which permits the width of the ultimate beam reflected from the concave mirror to be controlled according to the width of the narrow end of the speculum employed.

The form of viewing microscope employed may be of a very simple kind, but preferably comprises a monocular telescope with a prismatic erecting system.

Since the concave mirror must be slightly tilted in order to direct the light beam through the speculum mounting aperture and through a speculum mounted thereon, it is preferred that a slight cylindrical component is provided in the mirror.

When used as a proctoscope, for example for the sexing of young chickens by internal examination via their cloacae, the speculum is formed with a transparent closure at its distal end. Preferably, the whole speculum is formed of glass having a small bulb at the end, the surplus glass which remains after the operation of sealing off the tube being arranged to lie to one side of the bulb so that the end is substantially non-distorting; the internal surface of the remainder of the tube is coated with black paint to prevent or minimise any reflections and thus relieves the user of fatigue.

The speculum mounting for such glass tubes on the casing comprises a conical seating and a securing cap, having a central opening and a complementary conical seating preferably arranged to be screwed to the speculum mounting. When such a mounting is provided, the speculum is suitably formed by adhesively securing the open end of the glass tube to a projection upon a conical metal end piece which is so shaped and dimensioned as to fit between, and be clamped by, the co-operating conical faces of the above-mentioned conical seating and securing cap.

The invention will now be described with reference to the accompanying drawings in which—

Figure 1:
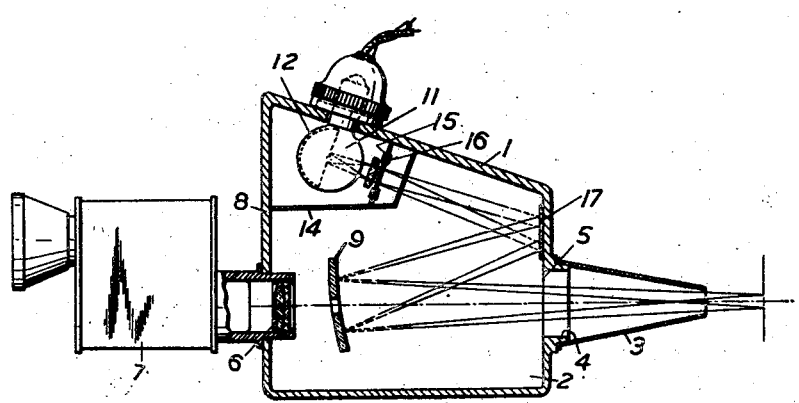
Figure 1 is a sectional elevation of an otological miscroscope.
Figure 2:
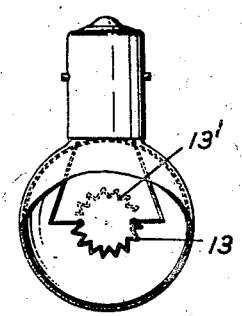
Figure 2 is an elevation of the lamp.
Figure 3:
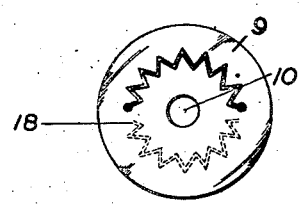
Figure 3 is a view of the concave mirror with the image of the lamp filament and its virtual image focussed thereon.

An otological microscope for conducting examinations and operations of the tympanic membrane and middle ear, in one preferred form is shown in Figure 1, comprises a casing 1 of trapezoidal shape which has two open sides 2 to allow insertion of necessary instruments into a speculum 3 which is detachably carried on an annular rib 4 surrounding an aperture 5 in the front of the casing 1. Lying co-axially with the speculum 3 is the collimating lens 6 of a monocular telescope 7, having a prismatic erecting system, which is mounted in the rear wall 8 of the casing 1. The characteristics of this telescope are important for the present purpose because the tympanic membrane is set very obliquely to the ear passage. It is therefore desirable to have an instrument with a good depth of field to enable the whole of the membrane to be viewed at once. This also allows the effect of disturbance of focus by reason of small movements of the instrument to be minimised. At the same time, it is, of course, desirable that the magnification produced shall be as high as possible consistent with having a good depth of field. It is found in practice that a magnification of 5–6 is about the optimum value.

A concave mirror 9 is arranged in the casing to lie across the axis of the speculum 3 and slightly inclined thereto. The central portion 10 of the mirror, which would actually have been on the axis of the speculum, is removed to leave a viewing aperture of a size sufficient to allow the whole of the aperture at the small end of a speculum 3 fitted to the casing to be seen through the microscope 7.

The illumination is produced by means of a special construction of electric lamp 11. The bulb of the lamp is spherical in shape and part of its exterior surface is silvered to act as a mirror 12. A filament of half-ring shape 13 is arranged near the centre of curvature of the mirror portion 12 of the bulb, so that when viewed from one side the filament and its inverted real image $13^1$ form together a complete ring of illumination.

This electric lamp 11 is contained in a separate light-proof compartment 14 at the top of the casing 1. In front of the bulb is mounted a condenser lens system 15 and an adjustable iris diaphragm 16. These components together with a plane mirror 17 mounted on the front wall of the casing just above the aperture 5, complete the parts of the optical illumination system.

The condensing lens system 15 is so chosen and positioned that it produces a real image 18 of the ring light source 13, $13^1$ around the viewing aperture 10 in the concave mirror 9, the real image 18 on the mirror being several times magnified as compared with the source. The light beams from the lamp 11 are folded by means of the plane mirror 17 to give the necessary length of light path from the condenser 15 to the concave mirror 9. The divergence of the light reflected from any point on the real image 18 on the concave mirror can be controlled by the iris diaphragm 16 and by stopping down or up by means of the iris diaphragm 16 the size of the illuminated area in the plane of the end of the speculum 3 can be controlled to be in accord with the size of the speculum employed.

The optical system employed, by forming a real image 18 on the surface of the concave mirror 9, avoids any appreciable amount of light being passed through the viewing orifice 10 to the eye of the operator and thus a great amount of glare is avoided, as well as by reason of the absence of substantial reflection from the sides of the speculum 3.

A further purpose to which the present device may be applied in addition to being used in examining and operating upon the tympanic membrane, is in testing the mobility of the membrane. To effect this purpose the large or inner end of the speculum is closed with a transparent window mounted in an air-tight stopper inserted into the speculum. A small bellows is connected with the interior of the speculum to enable the pressure inside the speculum to be raised or lowered, to move the membrane.

Figure 4:
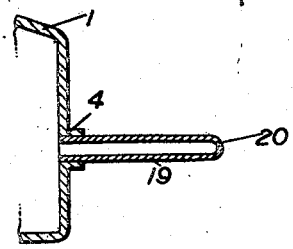
Figure 4 shows a fragment of the construction of Figure 1 adapted for the sexing of chickens.

When adapted to the sexing of young chickens, the apparatus is modified by the substitution for the speculum 3 of a glass tube 19 having a clear closed end 20 as is shown in Figure 4. A variety of different mountings may be employed for the glass tube in place of the simple slip-in mounting illustrated in Figure 4 and any suitable and convenient mounting may be employed which will firmly locate the glass tube in the correct position. The apparatus is also modified from that described with reference to Figure 1 in that the casing is wholly closed instead of being open at both sides.

We claim:

1. In an apparatus for examining cavities, the combination of a casing having front and rear apertures in line with each other for mounting a speculum and a viewing microscope respectively, a concave mirror arranged on the line of the sight between the two apertures and inclined with respect thereto, the portion of the mirror on the line of sight being light-passing to permit direct viewing through the mirror, a light source means arranged within the casing above the concave mirror for emitting a ring-shaped beam of light, a condenser lens system arranged in front of the light source means to form a real image of the light from said light source means in the vicinity of the surface of the concave mirror, and a plane mirror positioned on the front of the casing above the speculum aperture for reflecting the light from the condenser lens system back onto the concave mirror.

2. An apparatus according to claim 1 wherein the light-passing portion of said concave mirror is unsilvered.

3. An apparatus according to claim 1 wherein said concave mirror is formed with an aperture on said line of sight.

4. An apparatus according to claim 1 wherein said light source is an incandescent lamp having a substantially semi-circular filament housed within a spherical bulb one hemisphere of which is silvered.

5. An apparatus according to claim 1 wherein an adjustable iris diaphragm is mounted in front of the condenser lens.

6. An apparatus according to claim 1 wherein said casing is open at one side.

7. An apparatus according to claim 1 wherein said light source is disposed within a light-proof compartment located within said casing.

8. An apparatus according to claim 7 wherein an iris diaphragm is disposed in said light-proof compartment to control the light emitted by said light source.

9. An apparatus according to claim 8 wherein said iris diaphragm is located between the light source and the said condenser lens system.

10. An apparatus according to claim 9 wherein said iris diaphragm is adjustable.

11. A proctoscope comprising a casing, a speculum mounted on one wall of said casing, a viewing microscope mounted on the wall of the casing opposite said one wall, a mirror mounted within said casing on the wall carrying said speculum, a concave mirror mounted in said casing between said speculum and said microscope, said concave mirror having a light-passing portion in a line between said speculum and said microscope, a light-proof compartment mounted within said casing above said concave mirror, light source means within said compartment for producing a virtually ring-shaped beam of light, a condenser lens system in said casing for collecting said beam of light from said light source to direct it onto said mirror and to focus a real image of the light from said light source means on an annular area of the surface of said concave mirror around the light-passing portion therein, said concave mirror being positioned for directing the reflected light through said speculum out of said casing.

12. A proctoscope comprising a casing, a mounting for a speculum on one wall of said casing, a mounting for a viewing microscope on the wall of said casing opposite said one wall, a mirror mounted within said casing on the wall carrying said speculum mounting, a concave mirror in said casing between said speculum mounting and said microscope mounting said concave mirror having a light-passing portion in a line between said speculum and microscope mountings, a light-proof compartment mounted within said casing above said concave mirror, light source means mounted within said compartment for producing a virtually ring-shaped beam of light, a condenser lens system in said casing for collecting said beam of light from said light source to direct it upon said mirror and to focus a real image of the light from said light source means on an annular area of the surface of said concave mirror around the light-passing portion therein, said concave mirror being positioned for directing the reflected light through said speculum mounting.

13. A proctoscope according to claim 11 wherein said speculum is a narrow glass tube sealed at its distal end.

14. A proctoscope according to claim 13 wherein the side walls of said glass tube are coated with a non-reflecting coating.

15. A proctoscope according to claim 11 wherein said light source means is an incandescent lamp having a semi-circular filament and a spherical glass bulb in which said filament is mounted, said glass bulb being partly silvered to produce a virtually ring-shaped light source.

16. A proctoscope according to claim 11 wherein said light-proof compartment is provided with an adjustable iris diaphragm for adjusting the diameter of the light beam emitted from the light source means.

References Cited in the file of this patent

UNITED STATES PATENTS

| | | | |
|---|---|---|---|
| 627,011 | Prentice | June 13, | 1899 |
| 799,114 | Tracey | Sept. 12, | 1905 |
| 868,373 | Thomson | Oct. 15, | 1907 |
| 1,213,974 | Taylor | Jan. 30, | 1917 |
| 2,023,945 | Allyn | Dec. 10, | 1935 |
| 2,501,438 | Copeland | Mar. 21, | 1950 |
| 2,612,157 | Kizawa | Sept. 30, | 1952 |
| 2,697,431 | Antoine et al. | Dec. 21, | 1954 |